United States Patent
Ma et al.

(10) Patent No.: US 12,431,543 B2
(45) Date of Patent: Sep. 30, 2025

(54) BATTERY

(71) Applicant: Ningde Amperex Technology Limited, Ningde (CN)

(72) Inventors: Wentao Ma, Ningde (CN); Hengtao Xia, Ningde (CN); Chunrui Xu, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 649 days.

(21) Appl. No.: 17/708,986

(22) Filed: Mar. 30, 2022

(65) Prior Publication Data

US 2022/0223923 A1    Jul. 14, 2022

Related U.S. Application Data

(63) Continuation of application No. PCT/CN2020/077640, filed on Mar. 3, 2020.

(51) Int. Cl.
*H01M 10/0587* (2010.01)
*H01M 10/0567* (2010.01)
(Continued)

(52) U.S. Cl.
CPC ... *H01M 10/0587* (2013.01); *H01M 10/0567* (2013.01); *H01M 10/0569* (2013.01); *H01M 50/538* (2021.01); *H01M 2300/0051* (2013.01)

(58) Field of Classification Search
None
See application file for complete search history.

(56) References Cited

U.S. PATENT DOCUMENTS

2006/0051662 A1*  3/2006  Kwak ............... H01M 10/0431
                                                   429/130
2011/0014509 A1*  1/2011  Kim ................... H01M 50/489
                                                   429/246
(Continued)

FOREIGN PATENT DOCUMENTS

CN    202384439 U    8/2012
CN    202434661 U    9/2012
(Continued)

OTHER PUBLICATIONS

International Search Report dated Dec. 4, 2020, issued in counterpart application No. PCT/CN2020/077640, w/ English translation (7 pages).

(Continued)

*Primary Examiner* — Lisa S Park
(74) *Attorney, Agent, or Firm* — WHDA, LLP

(57) ABSTRACT

A battery includes an electrode assembly, an electrolytic solution, a package accommodating the electrode assembly, a first tab, a second tab, and a first filler. The electrode assembly is formed by winding a first electrode plate and a second electrode plate stacked. The first current collector includes a first blank region, a first single-surface-coated region, and a first double-surface-coated region. The first blank region includes a first planar region and a first bent region. The first single-surface-coated region includes a second bent region and a second planar region. The first tab is disposed in the first planar region. The second tab is disposed on the second electrode plate. The first filler is disposed in the first planar region or the second planar region. Projections of the first filler, the first tab, and the second tab in a thickness direction of the electrode assembly do not overlap.

15 Claims, 6 Drawing Sheets

(51) Int. Cl.
*H01M 10/0569* (2010.01)
*H01M 50/538* (2021.01)

(56) References Cited

U.S. PATENT DOCUMENTS

| | | | | |
|---|---|---|---|---|
| 2011/0274982 | A1* | 11/2011 | Kaneko | H01M 4/583 |
| | | | | 429/207 |
| 2013/0045405 | A1* | 2/2013 | Ahn | H01M 10/0431 |
| | | | | 429/211 |
| 2016/0190654 | A1* | 6/2016 | Nishimoto | H01M 50/538 |
| | | | | 429/162 |
| 2017/0170525 | A1 | 6/2017 | Mitani et al. | |
| 2020/0067063 | A1 | 2/2020 | Chen et al. | |

FOREIGN PATENT DOCUMENTS

| | | |
|---|---|---|
| CN | 203119049 U | 8/2013 |
| CN | 203774398 U | 8/2014 |
| CN | 205211872 U | 5/2016 |
| CN | 205828556 U | 12/2016 |
| CN | 205828578 U | 12/2016 |
| CN | 108258316 A | 7/2018 |
| CN | 208173723 U | 11/2018 |
| CN | 208690417 U | 4/2019 |
| JP | 2003157902 A | 5/2003 |
| JP | 2008041581 A | 2/2008 |
| JP | 2012-049089 A | 3/2012 |
| WO | 2016/013179 A1 | 1/2016 |

OTHER PUBLICATIONS

Extended Supplementary European Search Report dated Jul. 7, 2022, issued in counterpart Application No. 20923657.9. (11 pages).
Office Action dated Jul. 21, 2022, issued in counterpart CN application No. 202080004462.4, with English translation. (12 pages).
Office Action dated Mar. 30, 2023, issued in counterpart CN application No. 202080004462.4 with English translation. (7 pages).
Notification to Grant Patent Right for Invention dated Sep. 28, 2023, issued in counterpart CN Application No. 202080004462.4 with Partial English translation. (4 pages).
Decision to Grant a Patent dated Jun. 21, 2022, issued in counterpart JP Application No. 202-512546 with English translation. (6 pages).

* cited by examiner

BATTERY

CROSS-REFERENCE TO RELATED APPLICATIONS

This application is a national phase entry of International Application No. PCT/CN2020/077640, filed on Mar. 3, 2020 and entitled "BATTERY", which is incorporated herein by reference in its entirety.

TECHNICAL FIELD

This application relates to the electrochemical field, and in particular, to a battery.

BACKGROUND

A lithium battery is widely applied in portable electronic devices by virtue of advantages such as a high voltage, a high specific energy, and a long cycle life. Rapid development of the portable electronic devices imposes higher requirements on the battery. However, currently, most of jelly-roll battery cells have a problem of poor interface flatness, thereby affecting a current density distribution inside the battery cells. In addition, 1,3-propanesultone (1,3-propanesultone, PS) serving as a film-forming additive in an electrolytic solution is a carcinogen. If such additive is fully removed from the electrolytic solution, film formation on negative positive electrodes will be affected, and therefore, performance of the battery such as cycle performance and high-temperature storage performance will be affected. If a new film-forming additive is developed to replace the 1,3-propanesultone, manufacturing costs of the battery will increase significantly.

SUMMARY

In view of the foregoing situation, it is necessary to provide a battery to solve the foregoing problems.

A battery is disclosed, including an electrode assembly, a package accommodating the electrode assembly, an electrolytic solution contained in the package, a first tab, and a second tab. The electrode assembly is formed by winding a first electrode plate and a second electrode plate that are stacked. The first electrode plate includes a first current collector and a first active material layer disposed on both sides of the first current collector.

The electrolytic solution includes a lithium salt, an organic ester solvent, and a film-forming additive. The film-forming additive includes 1,3-propanesultone. A weight percent of the 1,3-propanesultone in the electrolytic solution is 0%-1%.

The first current collector includes a first blank region, a first single-surface-coated region, and a first double-surface-coated region disposed sequentially. The first blank region includes a first planar region extending from a winding initiation end of the first electrode plate to a first bend of the first electrode plate, and a first bent region connected to the first planar region. The first single-surface-coated region includes a second bent region and a second planar region connected between the first bent region and the second bent region; the second planar region is opposite to the first planar region. The second bent region is opposite to the first bent region.

The first tab is disposed in the first planar region. The second tab is disposed on the second electrode plate.

The battery further includes a first filler. The first filler is disposed in the first planar region or the second planar region. Projections of the first filler, the first tab, and the second tab in a thickness direction of the electrode assembly do not overlap.

Optionally, the second electrode plate includes a second current collector and a second active material layer disposed on both sides of the second current collector. The second current collector includes a second blank region and a second double-surface-coated region disposed sequentially. The second blank region includes a third planar region extending from a winding initiation end of the second electrode plate to a first bend of the second electrode plate, and a third bent region connected to the third planar region. The third planar region is opposite to the first planar region. The third bent region is opposite to the second bent region. The second tab is disposed on the third planar region.

Optionally, the first filler includes a first filler portion, a second filler portion, and a third filler portion. The first filler portion is disposed in the first bent region. The second filler portion is disposed in the second planar region. The third filler portion is disposed in the second bent region.

Optionally, the first tab includes a first end towards the first bent region and a second end facing opposite from the first end. The second tab includes a third end towards the first bent region and a fourth end facing opposite from the third end. In a width direction of the electrode assembly, a vertical distance from an end of the first filler portion to the third end is 0 mm-4 mm, the end of the first filler portion is towards the second bent region, and a vertical distance from an end of the second filler portion to the fourth end is 0 mm-4 mm, the end of the second filler portion is towards the first bent region, and a vertical distance from an end of the second filler portion to the first end is 0 mm-4 mm, the end of the second filler portion is towards the second bent region, and a vertical distance from an end of the third filler portion to the second end is 0 mm-4 mm, the end of the third filler portion is towards the first bent region.

Optionally, the second current collector further includes a second single-surface-coated region connected to the second double-surface-coated region and a third blank region connected to the second single-surface-coated region. The second single-surface-coated region and the third blank region are located on an outermost coil of the electrode assembly. The second single-surface-coated region includes a fourth bent region opposite to the second bent region; and the third blank region includes a fifth bent region opposite to the first bent region.

Optionally, the battery further includes a second filler. The second filler includes a fourth filler portion and a fifth filler portion. The fourth filler portion is disposed in the fourth bent region. The fifth filler portion is disposed in the fifth bent region. Projections of the fourth filler portion, the fifth filler portion, the first tab, and the second tab in the thickness direction of the electrode assembly do not overlap.

Optionally, the first tab includes a first end towards the first bent region and a second end facing opposite from the first end. The second tab includes a third end towards the first bent region and a fourth end facing opposite from the third end. In a width direction of the electrode assembly, a vertical distance from an end of the fourth filler portion to the third end is 0 mm-4 mm, the end of the fourth filler portion is towards the second bent region, and a vertical distance from an end of the fifth filler portion to the second end is 0 mm-4 mm, the end of the fifth filler portion is towards the first bent region.

Optionally, the battery further includes a second filler. The first filler includes a first portion, a second portion, and a third portion. The second filler includes a fourth portion connected between the first portion and the second portion and a fifth portion connected between the second portion and the third portion. The fourth portion is disposed on a surface facing opposite from the first tab in the first planar region. The fifth portion is disposed on a surface facing opposite from the second tab in the first planar region. The first portion and the second portion are disposed in the first planar region. The third portion is disposed in the first bent region.

Optionally, in the thickness direction of the electrode assembly, A1−B−C≤20 μm, A2−B−C≤20 μm, A3−B−D≤20 μm; wherein A1 is a thickness of the first portion, A2 is a thickness of the second portion, A3 is a thickness of the third portion, B is a thickness of the first tab, C is a thickness of the fourth portion, and D is a thickness of the fifth portion.

Optionally, the battery further includes a third filler. The third filler includes a first blank current collector opposite to the first bent region and a second blank current collector opposite to the first bent region. The first blank current collector is disposed at an end of the first planar region, the end of the first planar region is away from the first bent region, and is bent against the first planar region. The second blank current collector is disposed at an end of the first double-surface-coated region, the end of the first double-surface-coated region is away from the first blank region, and is bent against the first double-surface-coated region. Projections of the first blank current collector, the second blank current collector, the first tab, and the second tab in the thickness direction of the electrode assembly do not overlap.

Optionally, the first tab includes a first end towards the first bent region and a second end facing opposite from the first end. The second tab includes a third end towards the first bent region and a fourth end facing opposite from the third end. In a width direction of the electrode assembly, a vertical distance from an end of the first blank current collector to the second end is 0 mm-4 mm, the end of the first blank current collector is towards the first bent region, and a vertical distance from an end of the second blank current collector to the second end is 0 mm-4 mm, the end of the second blank current collector is towards the first bent region.

Optionally, the first filler includes a first coating, a second coating, a third coating, and a fourth coating. The first coating is disposed in the first planar region. The second coating is disposed in the first bent region. The third coating is disposed in the second planar region. The fourth coating is disposed in the second bent region.

Optionally, the first tab includes a first end towards the first bent region and a second end facing opposite from the first end. The second tab includes a third end towards the first bent region and a fourth end facing opposite from the third end. In a width direction of the electrode assembly, a vertical distance from an end of the first coating to the fourth end is 0 mm-4 mm, the end of the first coating is towards the first bent region, and a vertical distance from an end of the first coating to the first end is 0 mm-4 mm, the end is away from the first bent region, and a vertical distance from an end of the second coating to the third end is 0 mm-4 mm, the end of the second coating is towards the second bent region, and a vertical distance from an end of the third coating to the fourth end is 0 mm-4 mm, the end of the third coating is towards the first bent region, and a vertical distance from an end of the third coating to the first end is 0 mm-4 mm, the end of the third coating is away from the first bent region, and a vertical distance from an end of the fourth coating to the second end is 0 mm-4 mm, the end of the fourth coating is towards the first bent region.

Optionally, the organic ester solvent includes ethylene carbonate, propylene carbonate, ethyl methyl carbonate, and diethyl carbonate. A weight percent of the ethylene carbonate in the electrolytic solution is 5%-23%. A weight percent of the propylene carbonate in the electrolytic solution is 0%-30%. A weight percent of the ethyl methyl carbonate in the electrolytic solution is 0%-60%. A weight percent of the diethyl carbonate in the electrolytic solution is 0%-60%.

Optionally, the film-forming additive further includes vinylene carbonate, halogenated carbonate, and lithium difluorophosphate. A weight percent of the vinylene carbonate in the electrolytic solution is 0%-2%. A weight percent of the halogenated carbonate in the electrolytic solution is 0%-4%. A weight percent of the lithium difluorophosphate in the electrolytic solution is 0%-2%.

In conclusion, PS is a carcinogenic substance and is included in a candidate list of Substances of Very High Concern (SVHC) by the EU Reach regulations. Toys and other products that come into direct contact with children are particularly sensitive to the content of PS. Demand for environmentally friendly lithium-ion batteries with a low PS content is urgent. However, PS is an excellent film-forming additive. Insufficiency of PS will affect film formation of a solid electrolyte interface (Solid electrolyte interface, SEI), and affect battery performance such as cycle performance and high-temperature storage performance. By using the film-forming additives such as vinylene carbonate, halogenated carbonate, and lithium difluorophosphate, this application strengthens film formation on negative and positive electrodes, makes up for insufficient formation of the SEI film due to a lower content of PS. In addition, a current density is critical to the formation of the SEI film. The formation of the SEI film includes two processes: crystal nuclei formation, and crystal nuclei growth. When the current density is relatively high, the crystal nuclei are formed at a high speed, thereby leading to a loose structure of the SEI film and weak adhesion to a surface of the negative electrode. When an internal structure of the electrode assembly is unevenly distributed, different internal positions receive different forces during chemical formation, the current density is distributed unevenly, and the current density is too high in some local positions. Consequently, the formed SEI film is loose, unstable and poorly consistent. The disposed first filler compensates for a thickness difference between a tab part and a non-tab part arising from the disposed first tab and second tab, thereby improving flatness of the internal structure of the electrode assembly, facilitating even distribution of the current density inside the electrode assembly, and helping to form a consistent and stable SEI film.

REFERENCE NUMERALS

Figure 1:
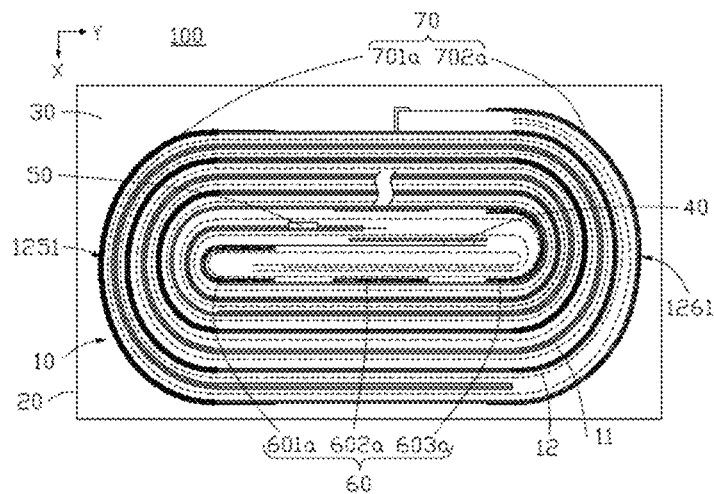
FIG. 1 is a schematic structural diagram of a battery according to an embodiment of this application.

Battery 100
Electrode assembly 10
First electrode plate 11
First current collector 111
First active material layer 112
First blank region 113
First planar region 1131
First bent region 1132
First single-surface-coated region 114
Second bent region 1141
Second planar region 1142
First double-surface-coated region 115
Second electrode plate 12
Second current collector 121
Second active material layer 122
Second blank region 123
Third planar region 1231
Third bent region 1232
Second double-surface-coated region 124
Second single-surface-coated region 125
Fourth bent region 1251
Third blank region 126
Fifth bent region 1261
Separator 13
Package 20
Electrolytic solution 30
First tab 40
First end 401
Second end 402
Second tab 50
Third end 501
Fourth end 502
First filler 60
First filler portion 601*a*
Second filler portion 602*a*
Third filler portion 603*a*
First portion 601*b*
Second portion 602*b*
Third portion 603*b*
First coating 601*c*
Second coating 602*c*
Third coating 603*c*
Fourth coating 604*c*
Second filler 70
Fourth filler portion 701*a*
Fifth filler portion 702*a*
Fourth portion 701*b*
Fifth portion 702*b*
Third filler 80
First blank current collector 801
Second blank current collector 802
First bonding portion 901
Second bonding portion 902
Third bonding portion 903
Fourth bonding portion 904
Fifth bonding portion 905

This application is further described below with reference to the following specific embodiments and the foregoing drawings.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. All other embodiments derived by a person of ordinary skill in the art based on the embodiments of this application without making any creative efforts shall fall within the protection scope of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

Figure 10:
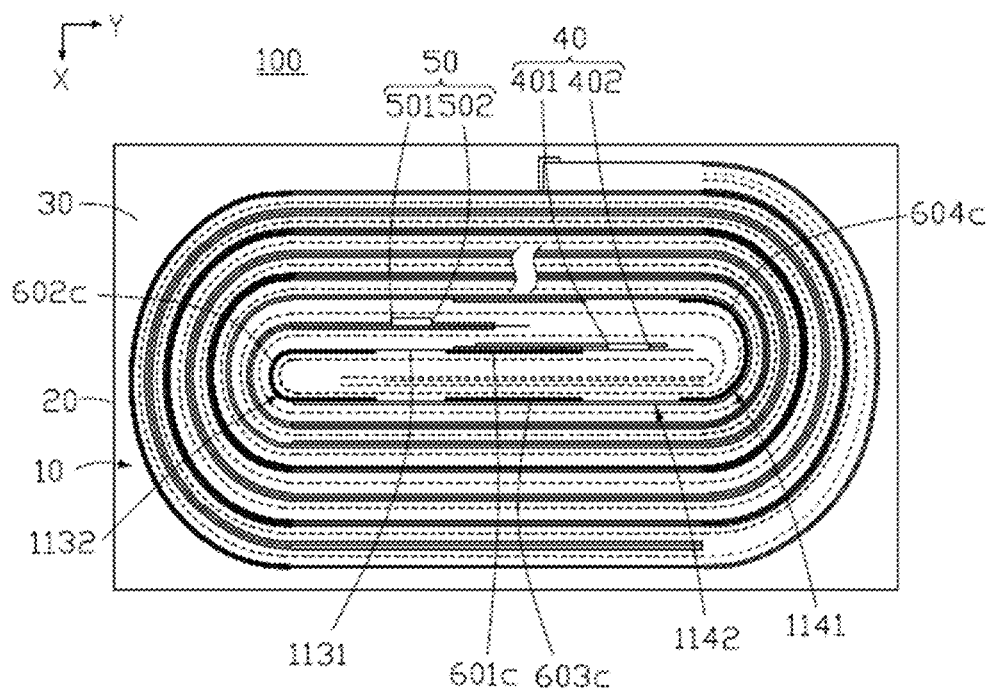
FIG. 10 is a schematic structural diagram of a battery according to another embodiment of this application.

Referring to FIG. 1 and FIG. 10, an embodiment of this application provides a battery 100. The battery 100 includes an electrode assembly 10, a package 20 accommodating the electrode assembly 10, an electrolytic solution 30 contained in the package 20, a first tab 40, a second tab 50, and a first filler 60.

The electrolytic solution 30 includes a lithium salt, an organic ester solvent, and a film-forming additive. The film-forming additive includes 1,3-propanesultone (PS). In the electrolytic solution 30, a weight percent of the 1,3-propanesultone is 0%-1%.

In an embodiment, the organic ester solvent includes ethylene carbonate (EC), propylene carbonate (PC), ethyl methyl carbonate (EMC), and diethyl carbonate (DEC). In the electrolytic solution 30, a weight percent of the ethylene carbonate is 5%-23%, a weight percent of the propylene carbonate is 0%-30%, a weight percent of the ethyl methyl carbonate is 0%-60%, and a weight percent of the diethyl carbonate is 0%-60%.

Further, the film-forming additive further includes vinylene carbonate (VC), halogenated carbonate, and lithium difluorophosphate ($LiPO_2F_2$). In the electrolytic solution 30, a weight percent of the vinylene carbonate is 0%-2%, a weight percent of the halogenated carbonate is 0%-4%, and a weight percent of the lithium difluorophosphate is 0%-2%.

Figure 2:
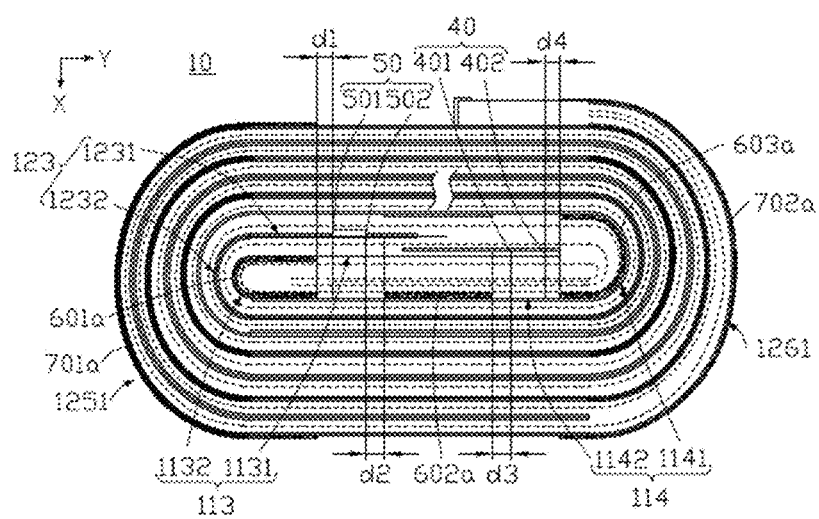
FIG. 2 is a schematic structural diagram of the electrode assembly shown in FIG. 1.

Referring to FIG. 1 and FIG. 2, the electrode assembly 10 is formed by winding a first electrode plate 11 and a second electrode plate 12 that are stacked. The first tab 40 is disposed on the first electrode plate 11. The second tab 50 is disposed on the second electrode plate 12.

Figure 3:
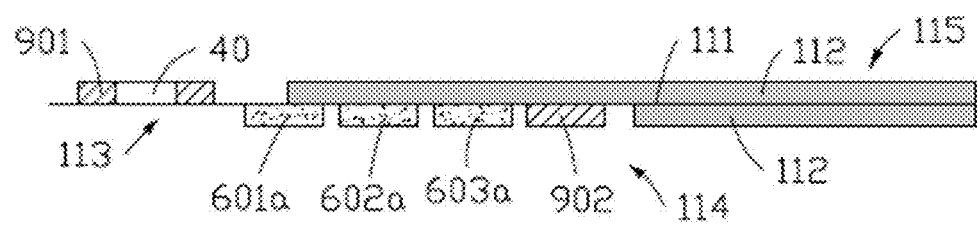
FIG. 3 is schematic structural diagram of a first electrode plate shown in FIG. 2.

Referring to FIG. 3, the first electrode plate 11 includes a first current collector 111 and a first active material layer 112 disposed on both sides of the first current collector 111.

Referring to FIG. 3, the first current collector 111 includes a first blank region 113, a first single-surface-coated region 114, and a first double-surface-coated region 115 that are disposed sequentially. The first active material layer 112 is disposed on neither side of the first blank region 113. The first active material layer 112 is not disposed on a surface that, in the first single-surface-coated region 114, faces a center of the electrode assembly 10 (referring to FIG. 3). The first active material layer 112 is disposed on both sides of the first double-surface-coated region 115.

Referring to FIG. 2, the first blank region 113 includes a first planar region 1131 extending from a winding initiation end of the first electrode plate 11 to a first bend of the first electrode plate 11, and a first bent region 1132 connected to the first planar region 1131. The first single-surface-coated region 114 includes a second bent region 1141 and a second planar region 1142 connected between the first bent region 1132 and the second bent region 1141. The second planar region 1142 is opposite to the first planar region 1131. The second bent region 1141 is opposite to the first bent region 1132. The first tab 40 is disposed on the first planar region 1131.

In an embodiment, the first tab 40 is disposed on a surface facing opposite from the center of the electrode assembly 10 in the first planar region 1131.

Alternatively, the first tab 40 is disposed on a surface facing the center of the electrode assembly 10 in the first planar region 1131.

Figure 4:
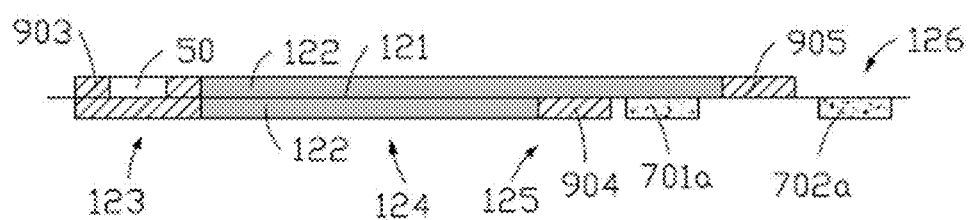
FIG. 4 is schematic structural diagram of a second electrode plate shown in FIG. 2.

Referring to FIG. 4, the second electrode plate 12 includes a second current collector 121 and a second active material layer 122 disposed on both sides of the second current collector 121.

The second current collector 121 includes a second blank region 123 and a second double-surface-coated region 124 disposed sequentially. The second active material layer 122 is disposed on neither side of the second blank region 123. The second active material layer 122 is disposed on both sides of the second double-surface-coated region 124.

Referring to FIG. 2, the second blank region 123 includes a third planar region 1231 extending from a winding initiation end of the second electrode plate 12 to a first bend of the second electrode plate 12, and a third bent region 1232 connected to the third planar region 1231. The third planar region 1231 is opposite to the first planar region 1131. The third bent region 1232 is opposite to the second bent region 1141. The second tab 50 is disposed on the third planar region 1231.

In an embodiment, the second tab 50 is disposed on a surface facing opposite from the center of the electrode assembly 10 in the third planar region 1231.

Alternatively, the second tab 50 is disposed on a surface facing the center of the electrode assembly 10 in the third planar region 1231.

Further, referring to FIG. 4, the second current collector 121 further includes a second single-surface-coated region 125 connected to the second double-surface-coated region 124, and a third blank region 126 connected to the second single-surface-coated region 125. The second single-surface-coated region 125 and the third blank region 126 are located on an outermost coil of the electrode assembly 10. The second active material layer 122 is not disposed on a surface that facing opposite from the center of the electrode assembly 10 in the second single-surface-coated region 125. The second active material layer 122 is disposed on neither side of the third blank region 126.

Referring to FIG. 2 and FIG. 4, the second single-surface-coated region 125 includes a fourth bent region 1251 opposite to the second bent region 1141. The third blank region 126 includes a fifth bent region 1261 opposite to the first bent region 1132.

Referring to FIG. 2, the first tab 40 includes a first end 401 towards the first bent region 1132 and a second end 402 facing opposite from the first end 401. The second tab 50 includes a third end 501 towards the first bent region 1132 and a fourth end 502 facing opposite from the third end 501.

Referring to FIG. 2, FIG. 5, FIG. 7, and FIG. 8, the first filler 60 is disposed in the first planar region 1131 or the second planar region 1142. Projections of the first filler 60, the first tab 40, and the second tab 50 in the thickness direction (that is, an X-axis direction) of the electrode assembly 10 do not overlap. In this way, the disposed first filler 60 compensates for a thickness difference between a tab part and a non-tab part arising from the disposed first tab 40 and second tab 50, thereby improving flatness of the internal structure of the electrode assembly 10 and facilitating even distribution of the current density inside the electrode assembly 10. The first filler 60 may be a green adhesive or a hot-melt adhesive.

In this embodiment, referring to FIG. 1 and FIG. 2, the first filler 60 includes a first filler portion 601a, a second filler portion 602a, and a third filler portion 603a. The first filler portion 601a is disposed in the first bent region 1132. The second filler portion 602a is disposed in the second planar region 1142. The third filler portion 603a is disposed in the second bent region 1141. In this way, the disposed second filler portion 602a compensates for a thickness difference between a tab part and a non-tab part arising from the disposed first tab 40 and second tab 50, thereby improving flatness of the internal structure of the electrode assembly 10, and facilitating even distribution of the current density inside the electrode assembly 10. In addition, the disposed first filler portion 601a and the third filler portion 603a compensates for a thickness difference in the bent region arising from the winding of the electrode plate, thereby effectively improving flatness of the internal structure of the electrode assembly 10 and facilitating even distribution of the current density inside the electrode assembly 10.

Referring to FIG. 2, in the width direction (that is, a Y-axis direction) of the electrode assembly 10, a vertical distance d1 from an end of the first filler portion 601a to the third end 501 is 0 mm-4 mm, the end of the first filler portion 601a is towards the second bent region 1141, and a vertical distance d2 from an end of the second filler portion 602a to the fourth end 502 is 0 mm-4 mm, the end of the second filler portion 602a is towards the first bent region 1132, and a vertical distance d3 from an end of the second filler portion 602a to the first end 401 is 0 mm-4 mm, the end of the second filler portion 602a is towards the second bent region 1141, and a vertical distance d4 from an end of the third filler portion 603a to the second end 402 is 0 mm-4 mm, the end of the third filler portion 603a is towards the first bent region 1132.

Further, referring to FIG. 2, a separator 13 is further disposed between the first electrode plate 11 and the second electrode plate 12. Also referring to FIG. 3, the battery 100 further includes a first bonding portion 901 and a second bonding portion 902. The first bonding portion 901 wraps the first tab 40. The second bonding portion 902 is disposed in the first single-surface-coated region 114, and located on a side of the third filler portion 603a, the side is away from the second filler portion 602a. The disposed first bonding portion 901 and second bonding portion 902 are configured to protect the separator 13, and prevent burrs on the first tab 40 and the first current collector 111 from piercing the separator 13.

In an embodiment, referring to FIG. 1, the battery 100 further includes a second filler 70. The second filler 70 includes a fourth filler portion 701a and a fifth filler portion 702a. The fourth filler portion 701a is disposed in the fourth bent region 1251, and the fifth filler portion 702a is disposed in the fifth bent region 1261. Projections of the fourth filler portion 701a, the fifth filler portion 702a, the first tab 40, and the second tab 50 on the electrode assembly 10 do not overlap. In this way, the disposed second filler 70 compensates for a thickness difference in the bent region arising from the winding of the electrode plate, thereby effectively improving flatness of the internal structure of the electrode assembly 10 and facilitating even distribution of the current density inside the electrode assembly 10. The second filler 70 may be a green adhesive or a hot-melt adhesive.

Referring to FIG. 2, in the width direction of the electrode assembly 10, the vertical distance d1 from an end of the fourth filler portion 701a to the third end 501 is 0 mm-4 mm, the end of the fourth filler portion 701a is towards the second bent region 1141, and the vertical distance d4 from an end of the fifth filler portion 702a to the second end 402 is 0 mm-4 mm, the end of the fifth filler portion 702a is towards the first bent region 1132.

Further, referring to FIG. 4, the battery 100 further includes a third bonding portion 903, a fourth bonding portion 904, and a fifth bonding portion 905. The third bonding portion 903 wraps the second tab 50. The fourth bonding portion 904 is disposed in the second single-surface-coated region 125, and located on a side of the fourth filler portion 701a, the side is away from the fifth filler portion 702a. The fifth bonding portion 905 is disposed on a surface facing opposite from the fifth filler portion 702a in the third blank region 126. The disposed third bonding portion 903, fourth bonding portion 904, and fifth bonding portion 905 are configured to protect the separator 13, and prevent burrs on the second tab 50 and the second current collector 121 from piercing the separator 13.

Figure 5:
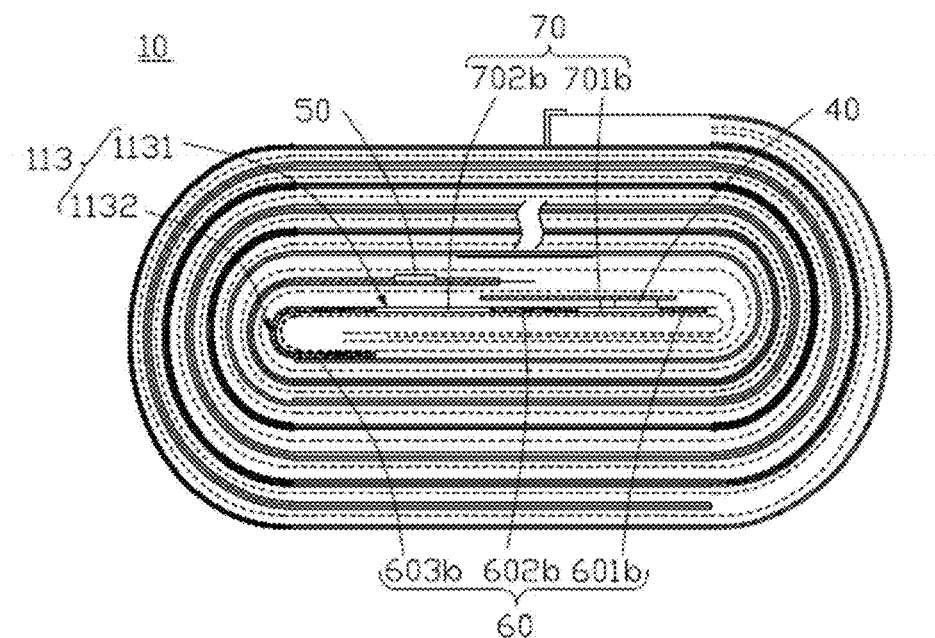
FIG. 5 is a schematic structural diagram of an electrode assembly according to an embodiment of this application.
Figure 6:
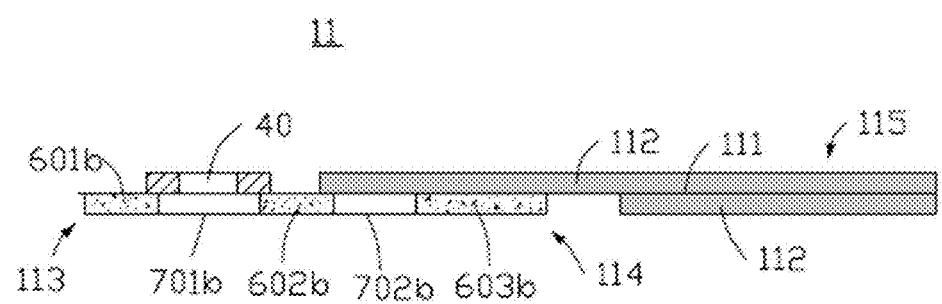
FIG. 6 is schematic structural diagram of a first electrode plate shown in FIG. 5.

In another embodiment, referring to FIG. 5 and FIG. 6, the first filler 60 includes a first portion 601b, a second portion 602b, and a third portion 603b. The battery 100 further includes a second filler 70. The second filler 70 includes a fourth portion 701b connected between the first portion 601b and the second portion 602b, and a fifth portion 702b connected between the second portion 602b and the third portion 603b. The fourth portion 701b is disposed on a surface facing opposite from the first tab 40 in the first planar region 1131. The fifth portion 702b is disposed on a surface facing opposite from the second tab 50 in the first planar region 1131. The first portion 601b and the second portion 602b are disposed in the first planar region 1131. The third portion 603b is disposed in the first bent region 1132. In this way, the disposed first portion 601b, second portion 602b, fourth portion 701b, and fifth portion 702b compensate for the thickness difference between the tab part and the non-tab part arising from the disposed first tab 40 and second tab 50, thereby improving the flatness of the internal structure of the electrode assembly 10, and facilitating even distribution of the current density inside the electrode assembly 10. In addition, the disposed third portion 603b compensates for the thickness difference in the bent region arising from the winding of the electrode plate, thereby effectively improving flatness of the internal structure of the electrode assembly 10 and facilitating even distribution of the current density inside the electrode assembly 10.

In the thickness direction of the electrode assembly 10, $A1-B-C \leq 20$ μm;

$A2-B-C \leq 20$ μm; and $A3-B-D \leq 20$ μm.

In the formulas above, A1 is a thickness of the first portion, A2 is a thickness of the second portion, A3 is a thickness of the third portion, B is a thickness of the first tab 40, C is a thickness of the fourth portion 701b, and D is a thickness of the fifth portion 702b.

Figure 7:
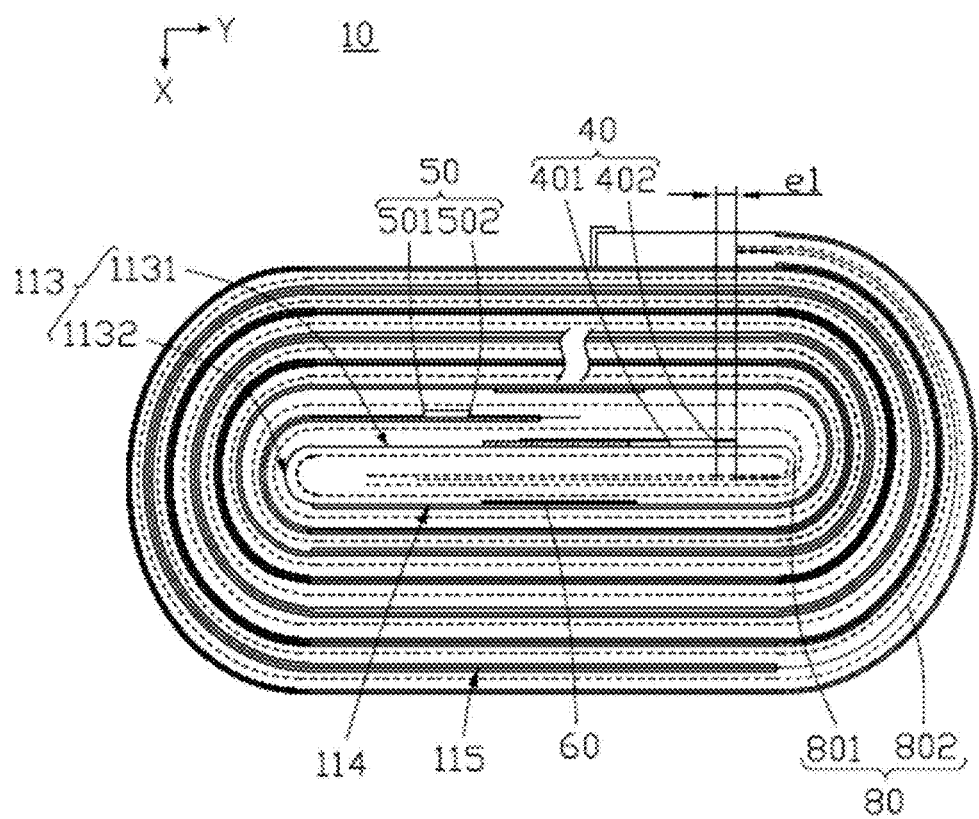
FIG. 7 is a schematic structural diagram of an electrode assembly according to another embodiment of this application.

In other embodiments, referring to FIG. 7, the battery 100 further includes a third filler 80. The third filler 80 includes a first blank current collector 801 opposite to the first bent region 1132 and a second blank current collector 802 opposite to the first bent region 1132. The first blank current collector 801 is disposed at an end of the first planar region 1131, the end of the first planar region 1131 is away from the first bent region 1132, and is bent against the first planar region 1131. The second blank current collector 802 is disposed at an end of the first double-surface-coated region 115, the end of the first double-surface-coated region 115 is away from the first blank region 113, and is bent against the first double-surface-coated region 115. Projections of the first blank current collector 801, the second blank current collector 802, the first tab 40, and the second tab 50 in the thickness direction of the electrode assembly 10 do not overlap. In this way, the disposed third filler 80 compensates for a thickness difference in the bent region arising from the winding of the electrode plate, thereby effectively improving flatness of the internal structure of the electrode assembly 10 and facilitating even distribution of the current density inside the electrode assembly 10.

In the width direction of the electrode assembly 10, a vertical distance e1 from an end of the first blank current collector 801 to the second end 402 is 0 mm-4 mm, the end of the first blank current collector 801 is towards the first bent region 1132, and a vertical distance e2 from an end of the second blank current collector 802 to the second end 402 is 0 mm-4 mm, the end of the second blank current collector 802 is towards the first bent region 1132.

Figure 8:
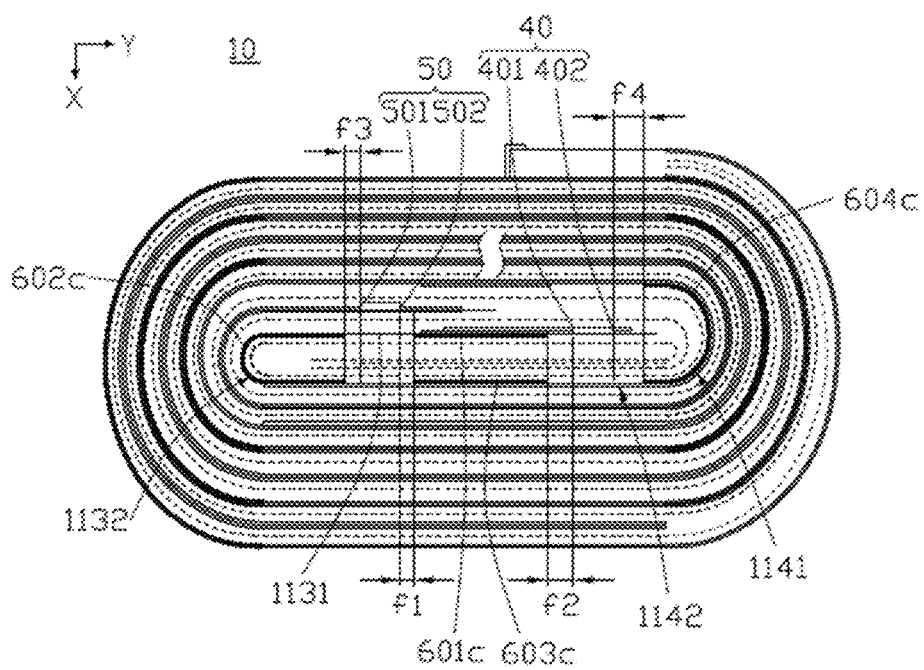
FIG. 8 is a schematic structural diagram of an electrode assembly according to still another embodiment of this application.
Figure 9:
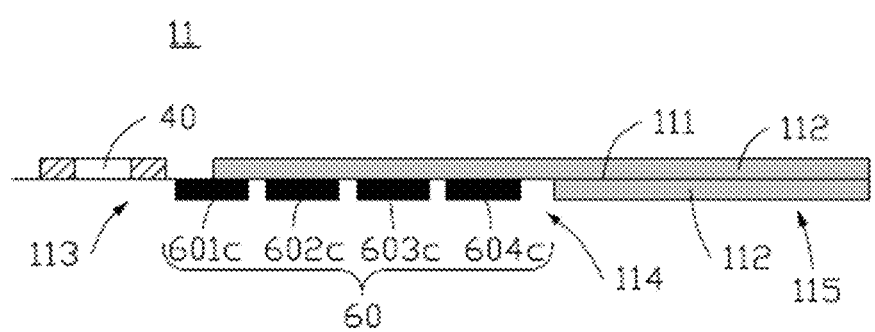
FIG. 9 is schematic structural diagram of a first electrode plate shown in FIG. 8.

In another embodiment, referring to FIG. 8 and FIG. 9, the first filler 60 includes a first coating 601c, a second coating 602c, a third coating 603c, and a fourth coating 604c. The first coating 601c is disposed in the first planar region 1131. The second coating 602c is disposed in the first bent region 1132. The third coating 603c is disposed in the second planar region 1142. The fourth coating 604c is disposed in the second bent region 1141. In this way, the disposed first coating 601c and third coating 603c compensate for the thickness difference between the tab part and the non-tab part arising from the disposed first tab 40 and second tab 50, thereby improving flatness of the internal structure of the electrode assembly 10 and facilitating even distribution of the current density inside the electrode assembly 10. In addition, the disposed second coating 602c and third coating 603c compensate for the thickness difference in the bent region arising from the winding of the electrode plate, thereby effectively improving flatness of the internal structure of the electrode assembly 10 and facilitating even distribution of the current density inside the electrode assembly 10.

In the width direction of the electrode assembly 10, a vertical distance f1 from an end of the first coating 601c to the fourth end 502 is 0 mm-4 mm, the end of the first coating 601c is towards the first bent region 1132, and a vertical distance f2 from an end of the first coating 601c to the first end 401 is 0 mm-4 mm, the end of the first coating 601c is away from the first bent region 1132, and a vertical distance f3 from an end of the second coating 602c to the third end 501 is 0 mm-4 mm, the end of the second coating 602c is towards the second bent region 1141, and a vertical distance f1 from an end of the third coating 603c to the fourth end 502 is 0 mm-4 mm, the end of the third coating 603c is towards the first bent region 1132, and a vertical distance f2 from an end of the third coating 603c to the first end 401 is 0 mm-4 mm, the end of the third coating 603c is away from the first bent region 1132, and a vertical distance f4 from an end of the fourth coating 604c to the second end 402 is 0 mm-4 mm, the end of the fourth coating 604c is towards the first bent region 1132.

The following describes the battery 100 in this application in detail with reference to embodiments.

Embodiment 1

Referring to FIG. 9 and FIG. 10, the battery 100 includes an electrode assembly 10, a package 20 accommodating the electrode assembly 10, an electrolytic solution 30 contained in the package 20, a first tab 40, a second tab 50, and a first filler 60.

The electrolytic solution 30 includes a lithium salt, an organic ester solvent, and a film-forming additive. The organic ester solvent includes ethylene carbonate (EC), propylene carbonate (PC), ethyl methyl carbonate (EMC), and diethyl carbonate (DEC). In the electrolytic solution 30, a weight percent of the ethylene carbonate is 5%-23%, a weight percent of the propylene carbonate is 0%-30%, a weight percent of the ethyl methyl carbonate is 0%-60%, and a weight percent of the diethyl carbonate is 0%-60%. The film-forming additive includes 1,3-propanesultone (PS), vinylene carbonate (VC), halogenated carbonate (FEC), and lithium difluorophosphate ($LiPO_2F_2$). In the electrolytic solution 30, a weight percent of the 1,3-propanesultone is 0%-1%, a weight percent of the vinylene carbonate is 0%-2%, a weight percent of the halogenated carbonate is 0%-4%, and a weight percent of the lithium difluorophosphate is 0%-2%.

Referring to FIG. 3 and FIG. 4, the electrode assembly 10 is formed by winding a first electrode plate 11 and a second electrode plate 12 that are stacked.

The first electrode plate 11 includes a first current collector 111 and a first active material layer 112 disposed on both sides of the first current collector 111.

The first current collector 111 includes a first blank region 113, a first single-surface-coated region 114, and a first double-surface-coated region 115 that are disposed sequentially.

Referring to FIG. 10, the first blank region 113 includes a first planar region 1131 extending from a winding initiation end of the first electrode plate 11 to a first bend of the first electrode plate 11, and a first bent region 1132 connected to the first planar region 1131. The first single-surface-coated region 114 includes a second bent region 1141 and a second planar region 1142 connected between the first bent region 1132 and the second bent region 1141. The second planar region 1142 is opposite to the first planar region 1131. The second bent region 1141 is opposite to the first bent region 1132.

The first tab 40 is disposed on a surface facing opposite from a center of the electrode assembly 10 in the first planar region 1131. The second tab 50 is disposed on the second electrode plate 12.

Referring to FIG. 9 and FIG. 10, the first filler 60 includes a first coating 601c, a second coating 602c, a third coating 603c, and a fourth coating 604c. The first coating 601c is disposed in the first planar region 1131. The second coating 602c is disposed in the first bent region 1132. The third coating 603c is disposed in the second planar region 1142. The fourth coating 604c is disposed in the second bent region 1141. Projections of the first filler 60, the first tab 40, and the second tab 50 in the thickness direction of the electrode assembly 10 do not overlap.

In Embodiment 1, the first tab 40 includes a first end 401 towards the first bent region 1132 and a second end 402 facing opposite from the first end 401. The second tab 50 includes a third end 501 towards the first bent region 1132 and a fourth end 502 facing opposite from the third end 501.

Referring to FIG. 8, in the width direction of the electrode assembly, a vertical distance from an end of the first coating 601c to the fourth end 502 is 0 mm-4 mm, the end of the first coating 601c is towards the first bent region 1132, and a vertical distance from an end of the first coating 601c to the first end 401 is 0 mm-4 mm, the end of the first coating 601c is away from the first bent region 1132, and a vertical distance from an end of the second coating 602c to the third end 501 is 0 mm-4 mm, the end of the second coating 602c is towards the second bent region 1141, and a vertical distance from an end of the third coating 603c to the fourth end 502 is 0 mm-4 mm, the end of the third coating 603c is towards the first bent region 1132, and a vertical distance from an end of the third coating 603c to the first end 401 is 0 mm-4 mm, the end of the third coating 603c is away from the first bent region 1132, and a vertical distance from an end of the fourth coating 604c to the second end 402 is 0 mm-4 mm, the end of the fourth coating 604c is towards the first bent region 1132.

Embodiment 2

Embodiment 2 differs from Embodiment 1 in the first filler 60 in Embodiment 2, and differs in that the battery 100 in Embodiment 2 further includes a second filler 70.

In Embodiment 2, referring to FIG. 5 and FIG. 6, the first filler 60 includes a first portion 601b, a second portion 602b, and a third portion 603b. The second filler 70 includes a fourth portion 701b connected between the first portion 601b and the second portion 602b, and a fifth portion connected between the second portion 602b and the third portion 603b. The fourth portion 701b is disposed on a surface that, in the first planar region 1131, faces opposite from the first tab 40. The fifth portion 702b is disposed on a surface facing opposite from the second tab 50 in the first planar region 1131. The first portion 601b and the second portion 602b are disposed in the first planar region 1131. The third portion 603b is disposed in the first bent region 1132.

In Embodiment 2, in the thickness direction of the electrode assembly 10, $A1-B-C \leq 20$ μm, $A2-B-C \leq 20$ μm, and $A3-B-D \leq 20$ μm.

In the formulas above, A1 is a thickness of the first portion 601b, A2 is a thickness of the second portion 602b, A3 is a thickness of the third portion 603b, B is a thickness of the first tab 40, C is a thickness of the fourth portion 701b, and D is a thickness of the fifth portion 702b.

Embodiment 3

Embodiment 3 differs from Embodiment 1 in the first filler 60 in Embodiment 3, and differs in that the battery 100 in Embodiment 3 further includes a second filler 70.

In Embodiment 3, referring to FIG. 4, the second electrode plate 12 includes a second current collector 121 and a second active material layer 122 disposed on both sides of the second current collector 121.

The second current collector 121 includes a second blank region 123, a second double-surface-coated region 124, a second single-surface-coated region 125, and a third blank region 126 disposed sequentially. The second single-surface-coated region 125 and the third blank region 126 are located on an outermost coil of the electrode assembly.

Referring to FIG. 1 and FIG. 2, the second blank region 123 includes a third planar region 1231 extending from a winding initiation end of the second electrode plate 12 to a first bend of the second electrode plate 12, and a third bent region 1232 connected to the third planar region 1231. The third planar region 1231 is opposite to the first planar region 1131. The third bent region 1232 is opposite to the first bent region 1132. The second tab 50 is disposed on a surface facing opposite from the center of the electrode assembly 10 in the third planar region 1231.

The second single-surface-coated region 125 includes a fourth bent region 1251 opposite to the second bent region 1141.

The third blank region 126 includes a fifth bent region 1261 opposite to the first bent region 1132.

Referring to FIG. 1 and FIG. 2, the first filler 60 includes a first filler portion 601*a*, a second filler portion 602*a*, and a third filler portion 603*a*. The first filler portion 601*a* is disposed in the first bent region 1132. The second filler portion 602*a* is disposed in the second planar region 1142. The third filler portion 603*a* is disposed in the second bent region 1141.

In the width direction of the electrode assembly, a vertical distance from an end of the first filler portion 601*a* to the third end 501 is 0 mm-4 mm, the end of the first filler portion 601*a* is towards the second bent region 1141, and a vertical distance from an end of the second filler portion 602*a* to the fourth end 502 is 0 mm-4 mm, the end of the second filler portion 602*a* is towards the first bent region 1132, and a vertical distance from an end of the second filler portion 602*a* to the first end 401 is 0 mm-4 mm, the end of the second filler portion 602*a* is towards the second bent region 1141, and a vertical distance from an end of the third filler portion 603*a* to the second end 402 is 0 mm-4 mm, the end of the third filler portion 603*a* is towards the first bent region 1132.

Referring to FIG. 1 and FIG. 2, the second filler 70 includes a fourth filler portion 701*a* and a fifth filler portion 702*a*. The fourth filler portion 701*a* is disposed in the fourth bent region 1251, and the fifth filler portion 702*a* is disposed in the fifth bent region 1261. Projections of the fourth filler portion 701*a*, the fifth filler portion 702*a*, the first tab 40, and the second tab 50 on the electrode assembly 10 do not overlap.

In the width direction of the electrode assembly 10, the vertical distance from an end of the fourth filler portion 701*a* to the third end 501 is 0 mm-4 mm, the end of the fourth filler portion 701*a* is towards the second bent region 1141, and the vertical distance from an end of the fifth filler portion 702*a* to the second end 402 is 0 mm-4 mm, the end of the fifth filler portion 702*a* is towards the first bent region 1132.

Embodiment 4

Embodiment 4 differs from Embodiment 1 in the first filler 60 in Embodiment 4, and differs in that the battery 100 in Embodiment 4 further includes a third filler 80.

Referring to FIG. 7, the first filler 60 is disposed in the first planar region 1131 or the second planar region 1142.

The third filler 80 includes a first blank current collector 801 opposite to the first bent region 1132 and a second blank current collector 802 opposite to the first bent region 1132. The first blank current collector 801 is disposed at an end of the first planar region 1131, the end of the first planar region 1131 is away from the first bent region 1132, and is bent against the first planar region 1131. The second blank current collector 802 is disposed at an end of the first double-surface-coated region 115, the end of the first double-surface-coated region 115 is away from the first blank region 113, and is bent against the first double-surface-coated region 115. Projections of the first blank current collector 801, the second blank current collector 802, the first tab 40, and the second tab 50 in the thickness direction of the electrode assembly 10 do not overlap.

In the width direction of the electrode assembly 10, a vertical distance from an end of the first blank current collector 801 to the second end 402 is 0 mm-4 mm, the end of the first blank current collector 801 is towards the first bent region 1132, and a vertical distance from an end of the second blank current collector 802 to the second end 402 is 0 mm-4 mm, the end of the second blank current collector 802 is towards the first bent region 1132.

The following describes the electrolytic solution 30 in this application in detail with reference to embodiments.

The electrolytic solution 30 includes a lithium salt, an organic ester solvent, and a film-forming additive. The organic ester solvent includes ethylene carbonate (EC), propylene carbonate (PC), ethyl methyl carbonate (EMC), and diethyl carbonate (DEC). The film-forming additive includes 1,3-propanesultone (PS), vinylene carbonate (VC), halogenated carbonate (FEC), and lithium difluorophosphate ($LiPO_2F_2$).

Ingredients and content thereof in Comparative Embodiment 1 and Embodiments 1-17 are listed in Table 1, and test conditions and test results of the battery 100 that uses the electrolytic solution 30 prepared in Comparative Embodiment 1 and Embodiments 1-17 are listed in Table 2.

TABLE 1

| Ingredient of electrolytic solution 30 | Molar concentration of lithium salt | Organic ester solvent | PS | VC | FEC | $LiPO_2F_2$ |
|---|---|---|---|---|---|---|
| Comparative Embodiment 1 | 1.0 mol/L | EC/PC/EMC/DEC | 0% | 0% | 0% | 0% |
| Embodiment 1 | 1.0 mol/L | EC/PC/EMC/DEC | 0.5% | 0% | 0% | 0% |
| Embodiment 2 | 1.0 mol/L | EC/PC/EMC/DEC | 1% | 0% | 0% | 0% |
| Embodiment 3 | 1.0 mol/L | EC/PC/EMC/DEC | 2% | 0% | 0% | 0% |
| Embodiment 4 | 1.0 mol/L | EC/PC/EMC/DEC | 3% | 0% | 0% | 0% |
| Embodiment 5 | 1.0 mol/L | EC/PC/EMC/DEC | 2% | 0.5% | 0% | 0% |
| Embodiment 6 | 1.0 mol/L | EC/PC/EMC/DEC | 2% | 1% | 0% | 0% |
| Embodiment 7 | 1.0 mol/L | EC/PC/EMC/DEC | 2% | 1.5% | 0% | 0% |
| Embodiment 8 | 1.0 mol/L | EC/PC/EMC/DEC | 2% | 0% | 2% | 0% |
| Embodiment 9 | 1.0 mol/L | EC/PC/EMC/DEC | 2% | 0% | 0% | 0.5% |
| Embodiment 10 | 1.0 mol/L | EC/PC/EMC/DEC | 2% | 1% | 2% | 0.5% |
| Embodiment 11 | 1.0 mol/L | EC/PC/EMC/DEC | 1% | 1% | 2% | 0.5% |

TABLE 1-continued

| Ingredient of electrolytic solution 30 | Molar concentration of lithium salt | Organic ester solvent | PS | VC | FEC | LiPO$_2$F$_2$ |
|---|---|---|---|---|---|---|
| Embodiment 12 | 1.0 mol/L | EC/PC/EMC/DEC | 0.5% | 1% | 2% | 0.5% |
| Embodiment 13 | 1.0 mol/L | EC/PC/EMC/DEC | 0% | 1% | 2% | 0.5% |
| Embodiment 14 | 1.0 mol/L | EC/PC/EMC/DEC | 0% | 1% | 2% | 0% |
| Embodiment 15 | 1.0 mol/L | EC/PC/EMC/DEC | 0% | 1.5% | 2% | 0% |
| Embodiment 16 | 1.0 mol/L | EC/PC/EMC/DEC | 0% | 1% | 3% | 0% |
| Embodiment 17 | 1.0 mol/L | EC/PC/EMC/DEC | 0% | 1% | 2% | 1% |

The percentages shown in Table 1 are the weight percent of PS, VC, FEC, and LiPO$_2$F$_2$ in the electrolytic solution 30. In the electrolytic solution 30, a weight percent of the ethylene carbonate is 5%-23%, a weight percent of the propylene carbonate is 0%-30%, a weight percent of the ethyl methyl carbonate is 0%-60%, and a weight percent of the diethyl carbonate is 0%-60%.

TABLE 2

| Test condition | Quantity of cycles of the battery 100 under 25° C. | Quantity of cycles of the battery 100 under 45° C. | Expansion rate of the battery 100 after 30-day storage under 60° C. | Expansion rate of the battery 100 after 3 cycles after 30-day storage under 60° C. |
|---|---|---|---|---|
| Comparative Embodiment 1 | 101 | 43 | 90% | 120% |
| Embodiment 1 | 155 | 89 | 60% | 90% |
| Embodiment 2 | 224 | 156 | 30% | 35% |
| Embodiment 3 | 287 | 205 | 15% | 17% |
| Embodiment 4 | 291 | 218 | 13% | 15% |
| Embodiment 5 | 368 | 284 | 10% | 11% |
| Embodiment 6 | 509 | 412 | 8% | 9% |
| Embodiment 7 | 549 | 467 | 6% | 6% |
| Embodiment 8 | 501 | 405 | 8% | 9% |
| Embodiment 9 | 489 | 401 | 7% | 8% |
| Embodiment 10 | 1050 | 859 | 4% | 4% |
| Embodiment 11 | 998 | 847 | 5% | 5% |
| Embodiment 12 | 969 | 825 | 6% | 6% |
| Embodiment 13 | 824 | 791 | 7% | 7% |
| Embodiment 14 | 678 | 577 | 8% | 8% |
| Embodiment 15 | 1008 | 919 | 5% | 5% |
| Embodiment 16 | 980 | 824 | 6% | 6% |
| Embodiment 17 | 991 | 851 | 4% | 4% |

In Table 2, after a capacity of the battery 100 is reduced to 80%, cycle performance and the expansion rate of the battery 100 are tested under different test conditions.

As can be learned from Table 1 and Table 2, the content of PS, VC, FEC, and LiPO$_2$F$_2$ is adjusted in this application. Therefore, the weight percent of PS in the electrolytic solution 30 is effectively controlled to be 0%-1% while excellent cycle performance and high-temperature storage performance of the battery 100 are ensured, thereby reducing hazards of PS to a human body.

The foregoing embodiments are merely intended for describing the technical solutions of this application but not intended as a limitation. Although this application is described in detail with reference to the foregoing optional embodiments, a person of ordinary skill in the art understands that modifications or equivalent substitutions may be made to the technical solutions of this application without departing from the spirit and conception of the technical solutions of this application.

What is claimed is:

1. A battery, comprising: an electrode assembly, a package accommodating the electrode assembly, an electrolytic solution contained in the package, a first tab, and a second tab; wherein the electrode assembly is formed by winding a first electrode plate and a second electrode plate that are stacked, and the first electrode plate comprises a first current collector and a first active material layer disposed on both sides of the first current collector;

the electrolytic solution comprises a lithium salt, an organic ester solvent, and a film-forming additive;

the film-forming additive comprises 1,3-propanesultone, a weight percent of the 1,3-propanesultone in the electrolytic solution is 0%-1%;

the first current collector comprises a first blank region, a first single-surface-coated region, and a first double-surface-coated region disposed sequentially;

the first blank region comprises a first planar region extending from a winding initiation end of the first electrode plate to a first bend of the first electrode plate, and a first bent region connected to the first planar region;

the first single-surface-coated region comprises a second bent region and a second planar region connected between the first bent region and the second bent region; the second planar region is opposite to the first planar region, the second bent region is opposite to the first bent region;

the first tab is disposed in the first planar region, the second tab is disposed on the second electrode plate at a winding initiation end of the second electrode plate, the winding initiating end being at an innermost end of the second electrode plate;

the battery further comprises a first filler, the first filler is disposed in the first planar region or the second planar region; wherein when viewed in the thickness direction of the electrode assembly, the first filler, the first tab, and the second tab do not overlap.

2. The battery according to claim 1, wherein the second electrode plate comprises a second current collector and a second active material layer disposed on both sides of the second current collector; the second current collector comprises a second blank region and a second double-surface-coated region disposed sequentially; the second blank region comprises a third planar region extending from the winding initiation end of the second electrode plate to a first bend of the second electrode plate, and a third bent region connected to the third planar region; the third planar region is opposite to the first planar region; the third bent region is opposite to the second bent region; and the second tab is disposed on the third planar region.

3. The battery according to claim 2, wherein the first filler comprises a first filler portion, a second filler portion, and a third filler portion; the first filler portion is disposed in the first bent region; the second filler portion is disposed in the second planar region; and the third filler portion is disposed in the second bent region.

4. The battery according to claim 3, wherein the first tab comprises a first end towards the first bent region and a second end facing opposite from the first end; the second tab comprises a third end towards the first bent region and a fourth end facing opposite from the third end; and, in a width direction of the electrode assembly, a vertical distance from an end of the first filler portion to the third end is 0 mm-4 mm; a vertical distance from an end of the second filler portion to the fourth end is 0 mm-4 mm; a vertical distance from an end of the second filler portion to the first end is 0 mm-4 mm; and a vertical distance from an end of the third filler portion to the second end is 0 mm-4 mm.

5. The battery according to claim 2, wherein the second current collector further comprises a second single-surface-coated region connected to the second double-surface-coated region and a third blank region connected to the second single-surface-coated region; the second single-surface-coated region and the third blank region are located on an outermost coil of the electrode assembly; the second single-surface-coated region comprises a fourth bent region opposite to the second bent region; and the third blank region comprises a fifth bent region opposite to the first bent region.

6. The battery according to claim 5, further comprising a second filler; the second filler comprises a fourth filler portion and a fifth filler portion; the fourth filler portion is disposed in the fourth bent region; the fifth filler portion is disposed in the fifth bent region; and projections of the fourth filler portion, the fifth filler portion, the first tab, and the second tab in the thickness direction of the electrode assembly do not overlap.

7. The battery according to claim 6, wherein the first tab comprises a first end towards the first bent region and a second end facing opposite from the first end; the second tab comprises a third end towards the first bent region and a fourth end facing opposite from the third end; and, in a width direction of the electrode assembly; a vertical distance from an end of the fourth filler portion to the third end is 0 mm-4 mm; and a vertical distance from an end of the fifth filler portion to the second end is 0 mm-4 mm.

8. The battery according to claim 1, further comprising a second filler; the first filler comprises a first portion, a second portion, and a third portion; the second filler comprises a fourth portion connected between the first portion and the second portion, and a fifth portion connected between the second portion and the third portion; the fourth portion is disposed on a surface facing opposite from the first tab in the first planar region; the fifth portion is disposed on a surface facing opposite from the second tab in the first planar region; the first portion and the second portion are disposed in the first planar region; and the third portion is disposed in the first bent region.

9. The battery according to claim 8, wherein, in the thickness direction of the electrode assembly, $A1-B-C \leq 20$ μm;

$A2-B-C \leq 20$ μm;

$A3-B-D \leq 20$ μm; wherein

A1 is a thickness of the first portion, A2 is a thickness of the second portion, A3 is a thickness of the third portion, B is a thickness of the first tab, C is a thickness of the fourth portion, and D is a thickness of the fifth portion.

10. The battery according to claim 1, further comprising a first blank current collector opposite to the first bent region and a second blank current collector opposite to the first bent region, and the first blank current collector is disposed at an end of the first planar region, the end of the first planar region being away from the first bent region, and is bent away from the first planar region; the second blank current collector is disposed at an end of the first double-surface-coated region, the end of the first double-surface-coated region being away from the first blank region, and is bent away from the first double-surface-coated region; and projections of the first blank current collector, the second blank current collector, the first tab, and the second tab in the thickness direction of the electrode assembly do not overlap.

11. The battery according to claim 10, wherein the first tab comprises a first end towards the first bent region and a second end facing opposite from the first end; the second tab comprises a third end towards the first bent region and a fourth end facing opposite from the third end; and, in a width direction of the electrode assembly, a vertical distance from an end of the first blank current collector to the second end is 0 mm-4 mm, and a vertical distance from an end of the second blank current collector to the second end is 0 mm-4 mm.

12. The battery according to claim 1, wherein the first filler comprises a first coating, a second coating, a third coating, and a fourth coating; the first coating is disposed in the first planar region; the second coating is disposed in the first bent region; the third coating is disposed in the second planar region; and the fourth coating is disposed in the second bent region.

13. The battery according to claim 12, wherein the first tab comprises a first end towards the first bent region and a second end facing opposite from the first end; the second tab comprises a third end towards the first bent region and a fourth end facing opposite from the third end; and, in a width direction of the electrode assembly, a vertical distance from an end of the first coating to the fourth end is 0 mm-4 mm, a vertical distance from an end of the first coating to the first end is 0 mm-4 mm, a vertical distance from an end of the second coating to the third end is 0 mm-4 mm, a vertical distance from an end of the third coating to the fourth end is 0 mm-4 mm, a vertical distance from an end of the third coating to the first end is 0 mm-4 mm, and a vertical distance from an end of the fourth coating to the second end is 0 mm-4 mm.

14. The battery according to claim 1, wherein the organic ester solvent comprises ethylene carbonate, propylene carbonate, ethyl methyl carbonate, and diethyl carbonate, a weight percent of the ethylene carbonate in the electrolytic solution is 5%-23%, a weight percent of the propylene carbonate in the electrolytic solution is 0%-30%, a weight percent of the ethyl methyl carbonate in the electrolytic solution is 0%-60%, and a weight percent of the diethyl carbonate in the electrolytic solution is 0%-60%.

15. The battery according to claim 14, wherein the film-forming additive further comprises vinylene carbonate, halogenated carbonate, and lithium difluorophosphate, a weight percent of the vinylene carbonate in the electrolytic solution is 0%-2%, a weight percent of the halogenated carbonate in the electrolytic solution is 0%-4%, and a weight percent of the lithium difluorophosphate in the electrolytic solution is 0%-2%.

* * * * *